April 15, 1969     H. R. CHOPE     3,439,166
MEASURING ABLATION SHIELD THICKNESS
Filed Nov. 4, 1964     Sheet 1 of 4
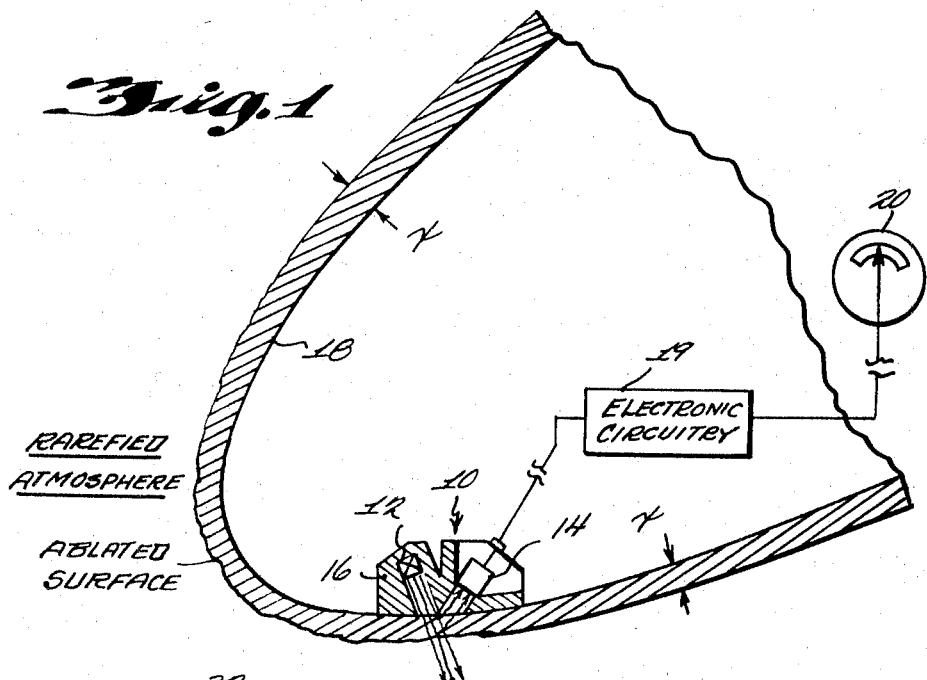
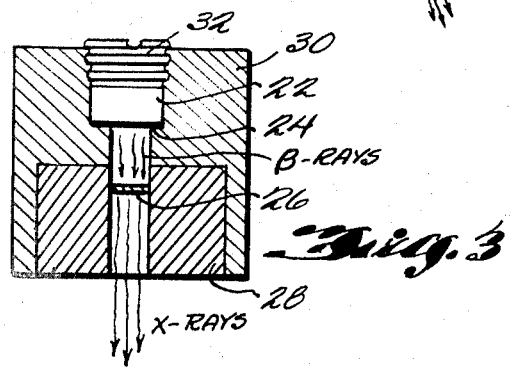
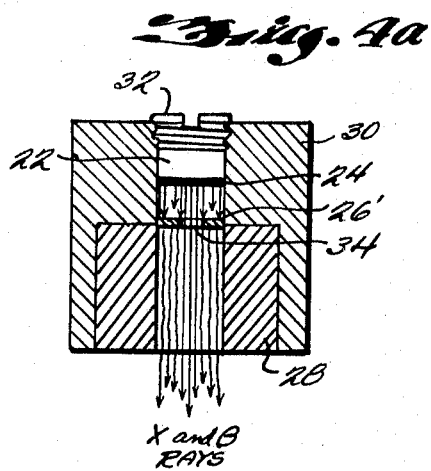
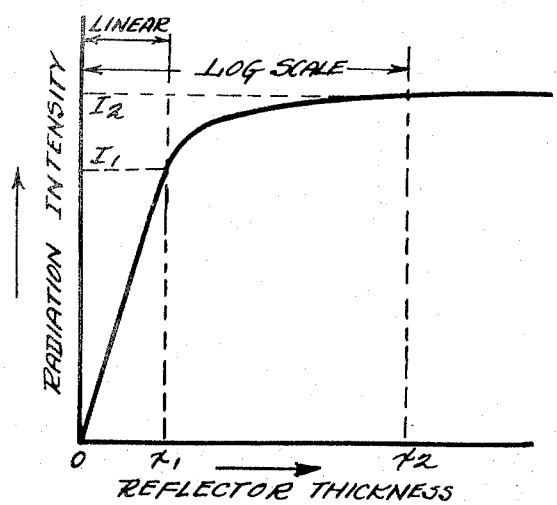
INVENTOR
HENRY R. CHOPE
BY Cushman, Darby & Cushman
ATTORNEYS

INVENTOR
HENRY R. CHOPE

BY Cushman, Darby & Cushman

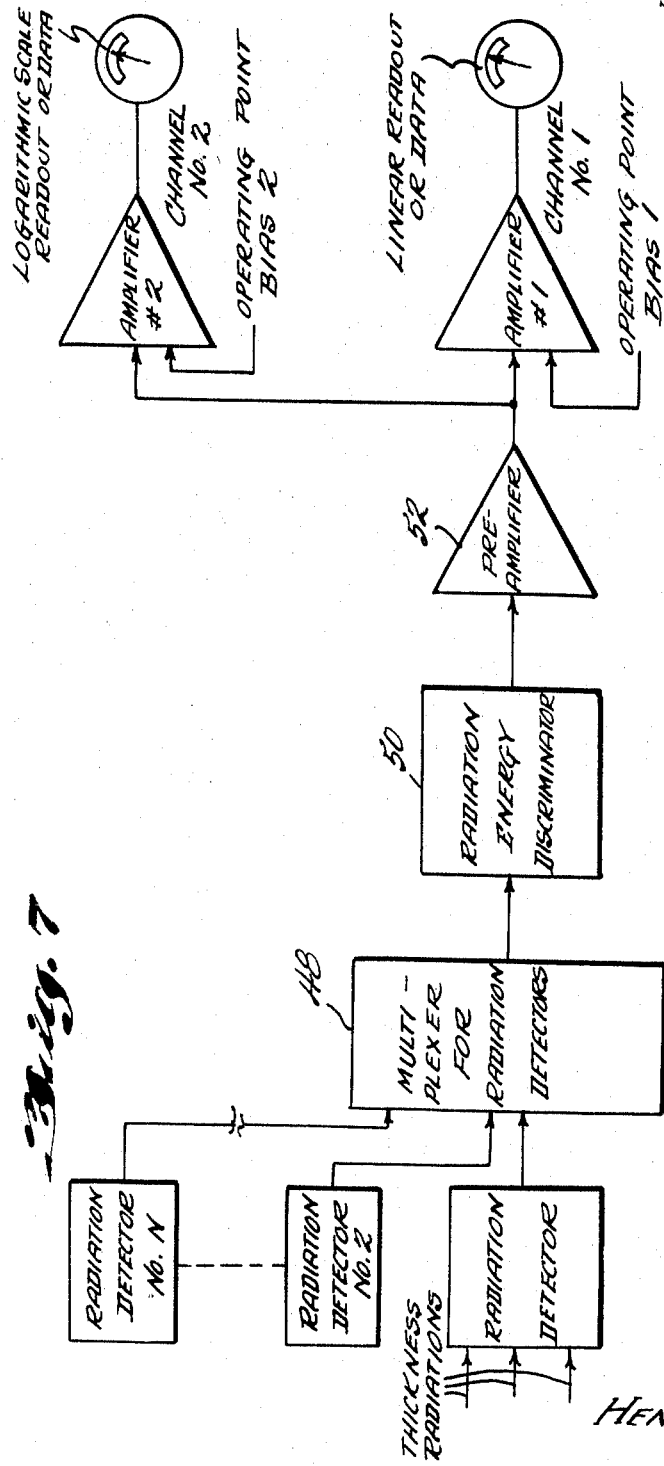

United States Patent Office 3,439,166
Patented Apr. 15, 1969

3,439,166
MEASURING ABLATION SHIELD THICKNESS
Henry R. Chope, Columbus, Ohio, assignor to The Industrial Nucleonics Corporation, a corporation of Ohio
Filed Nov. 4, 1964, Ser. No. 408,955
Int. Cl. G01t 1/16; H01j 39/12, 35/00
U.S. Cl. 250—83.3                                    11 Claims

ABSTRACT OF THE DISCLOSURE

For measuring the thickness of the nose section or outer skin or wall of a space vehicle during re-entry one or more nucleonics sensing devices are provided on the nose section of the vehicle. Two approaches are described. One approach uses a penetrating radiation source and detects the backscattered radiation from the outer skin or wall. Various simple or compound radiation sources can be used in this first method. Among those described and generically or specifically claimed are (1) a gamma radiating source, (2) a beta excited X-ray source, and (3) a novel compound beta-bremsstrahlung X-ray source.

---

Figure 2A:
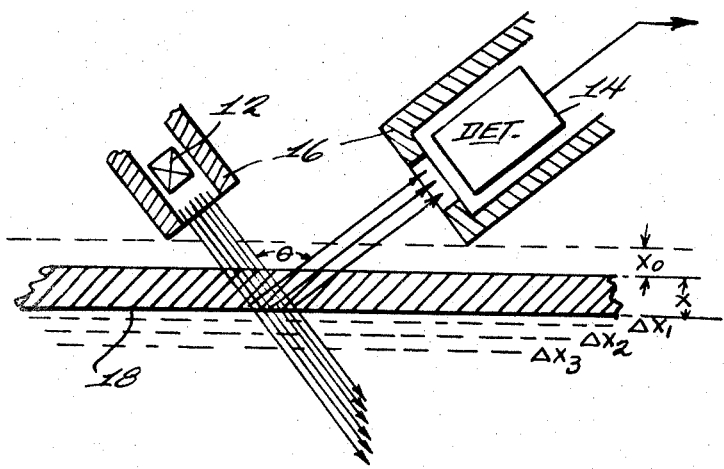

The second method of measuring ablation wall thickness involves the impregnation or distribution of radioactive material in specifically positioned "core" areas in the ablation skin. A sensitive radiation detector corresponding to each core receives the radiation from the core section. As the outer surface of the ablation material "burns off," the received radiation is reduced accordingly.

This invention relates to spacecraft entry into a planet's atmosphere, and more particularly to the measuring of thickness of an ablation shield or the like during re-entry of a spacecraft into an atmosphere.

In order that a spacecraft or vehicle perform a useful function, in many instances it is required that the craft re-enter the earth's atmosphere or enter the atmosphere of other planets. The vehicle must be controlled within prescribed limits of altitude, deceleration, and temperature if its payload is to survive. This survival takes on major importance in the case in which a human operator is on board. Much of the re-entry survival task involves the management of energy.

As the vehicle re-enters the atmosphere, its kinetic and potential energy is converted into heat energy. This heat energy causes temperature build-up. One way of "absorbing" the heat energy is by allowing it to ablate (or burn off) the surface of a nosecap or heat shield. As the nosecap or heat shield is burned off, its wall thickness is reduced.

The principal object of this invention is therefore the provision of methods and corresponding apparatus for measuring the thickness of the ablation material during entry or re-entry of a spacecraft into an atmosphere. A continuous readout of this thickness should provide valuable information to the pilot of a vehicle. Various schemes for flying thermal rate patterns have been advanced. In one scheme, an automatic flight control system is based upon temperature sensing of the vehicle's skin as the input to the flight control system. An equally important data input is precise information on the burn-off rate and thickness of the ablation surface.

Another object of this invention is the provision of several types of nucleonics sensing devices for measuring the thickness of the nose section or outer skin or wall of a space vehicle during re-entry. Two approaches are described. One approach uses a penetrating radiation source and detects the backscattered radiation from the outer skin or wall. Various simple or compound radiation sources can be used in this first method. Among those described and generically or specifically claimed are (1) a gamma radiating source, (2) a beta excited X-ray source, and (3) a novel compound beta-bremsstrahlung X-ray source.

The second method of measuring ablation wall thickness involves the impregnation or distribution of radioactive material in specifically positioned "core" areas in the ablation skin. A sensitive radiation detector corresponding to each core receives the radiation from the core section. As the outer surface of the ablation material "burns off," the received radiation is reduced accordingly.

Among other specific objects and advantages of my nucleonics method and apparatus for nosecap thickness measurement are the following:

(1) The sensors are lightweight and reasonably small in size.
(2) There is negligible power required for operation of the system.
(3) The source-detector system provides negligible internal radiation.
(4) Measurement is made rapidly with a high degree of accuracy.
(5) By use of my novel radiation source, certain regions of thickness can be measured with high sensitivity and good linearity.

Figure 2B:
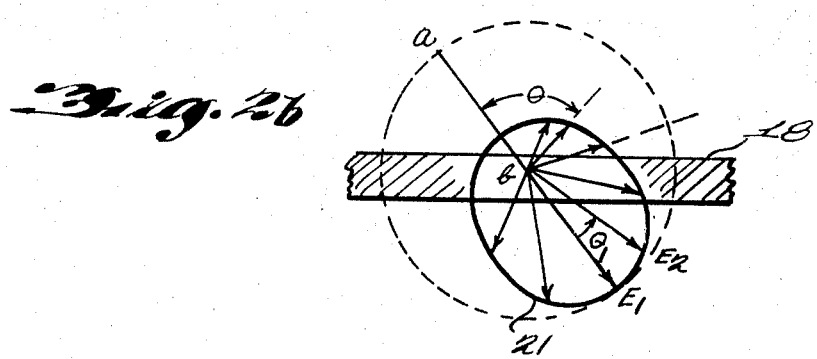
Figure 2C:
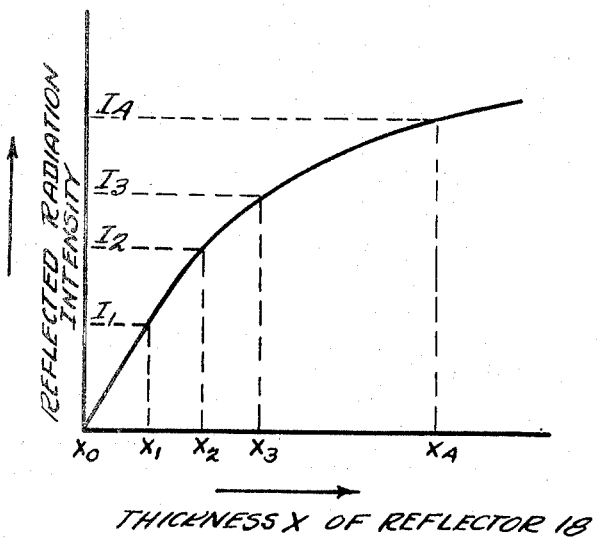
Figure 5:
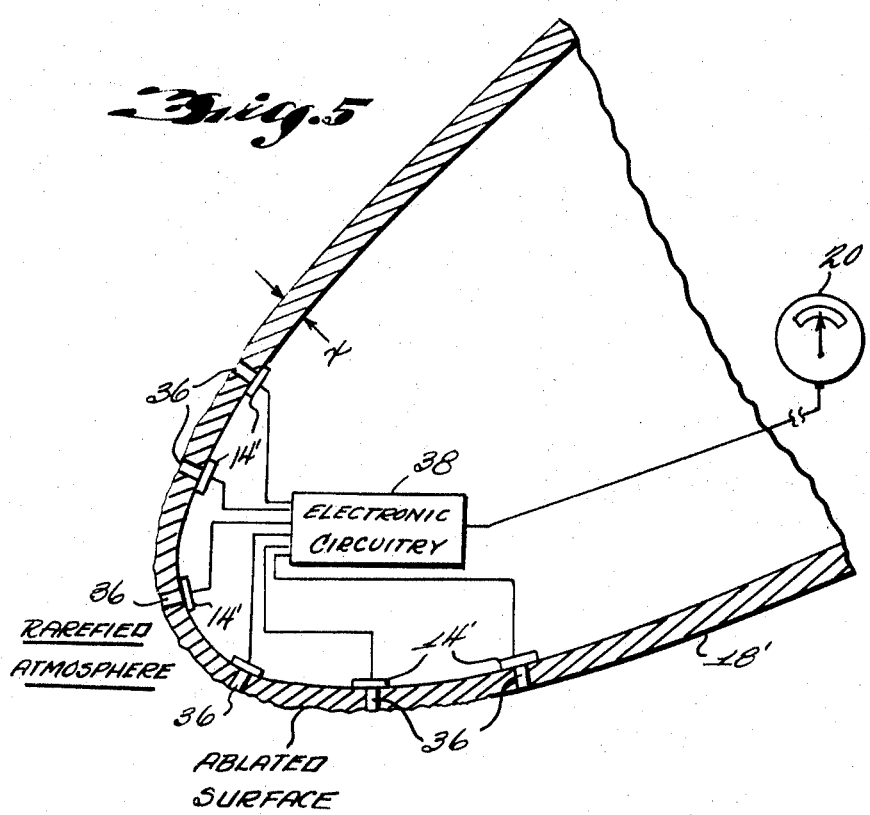
Figure 6:
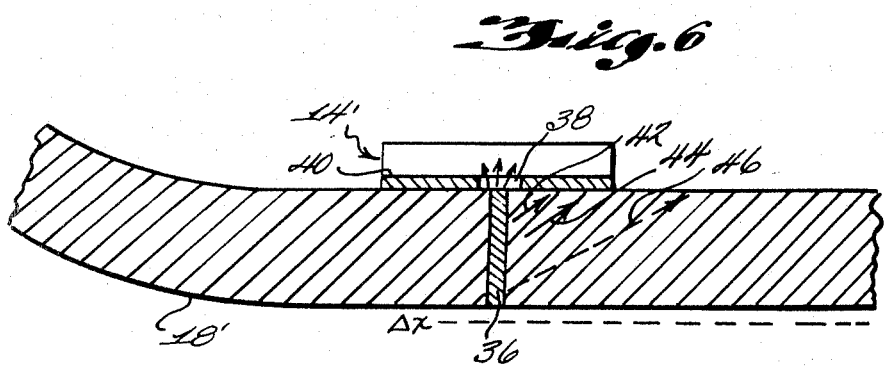

Other objects and advantages will become apparent to those of ordinary skill in the art upon reading the appended claims and the following detailed specification with the attached drawings, in which:

FIGURE 1 illustrates an ablation shield thickness measuring device of the backscatter type inside a nosecap shown in cross-section, FIGURE 2a illustrates backscatter type source-detector geometries, FIGURE 2b is a diagram showing Compton scattering as function of source angle, FIGURE 2c is an intensity vs. thickness curve, FIGURE 3 is a cross-sectional view of a beta-excited X-ray source with low shielding requirements, FIGURE 4a is a cross-sectional view of a compound X-ray and beta-ray source for a high thickness sensitivity reflection gauge, FIGURE 4b shows an intensity vs. thickness curve for the source of FIGURE 4a, FIGURE 5 illustrates an ablation shield thickness measuring device of the transmission type in accordance with this invention, FIGURE 6 is a cross-sectional detail of a radiation core and detector arrangment of FIGURE 5, and FIGURE 7 is a block diagram of electronics usable in the FIGURE 5 circuitry.

In the backscatter or reflection method of measurement, a lightweight radiation source and detector are placed on the inside surface of the shield. Reflected radiation is detected and, when properly measured, converted to a corresponding reading of thickness.

FIGURE 1 is a diagram illustrating this principle of operation. Sensing unit 10, including source 12, detector 14, and the collimating shielding 16 around both the source and detector, is shown in greatly magnified scale in a desired location adjacent the inner side of the nosecap shielding skin or wall 18 to which unit 10 may be secured in any desired manner. As the nosecap shield 18 enters the rarefied atmosphere, it is heated. Heat energy is consumed in ablating or burning away the outer surface of shield 18. More than one sensing unit 10 may be used, if desired, at various locations around the inner side of wall 18 where ablation is likely to occur.

While the radiation from source 12 may be directed perpendicularly onto wall 18 with the detector being similarly arranged, i.e., in line with the source, as in FIG. 8 of the Foster Patent 2,964,631, it presently is preferred that the angles of radiation incidence and reflection be acute relative to wall 18, as shown, so that the area of intersection of the incident and reflected rays is maximum inside wall 18 and minimum outside thereof to give a sensing as to a larger wall cross-section than if incidence were perpendicular.

FIGURES 2a, 2b, and 2c show in simplified form the operation of the reflected measurement. Referring to FIGURE 2a, radiation from the shielded source 12 is directed toward the shield 18 at an angle. If the shield thickness is zero, there is effectively no scattered radiation, i.e., at most only an insignificantly small amount from surrounding air, back into the shielded detector 14. For a shield of finite thickness, $x$, a certain percentage of the radiation will be reflected back into the detector. The rest of the radiation will either be absorbed in the shield or transmitted through it. The detected radiation is transformed into electrical signals in detector 14 and applied via conventional electronic circuitry 19 to a meter 20, which may be remotely located adjacent an astroaut for exampe for providing visual indications of the thickness of wall 18.

For an electromagnetic radiation in the energy region of 1 mev., gamma rays, the predominant mechanism for scattering and absorption is Compton scattering, as is well known. There is a definite relationship between the angle of scatter and the energy of the scattered radiation. This is illustrated in FIGURE 2b, wherein radiation incoming along the line $a$–$b$ with energy of a radius unit is shown scattered in various directions and amounts according to the various illustrated energy vectors which form an oblong locus 21. Radiation not scattered (vector $E_1$) or scattered only through a small angle (e.g., $\theta_1$ for vector $E_2$) is not greatly modified in energy ($E_1$ and $E_2$ approximately equal $a$–$b$). Photons of radiation scattered through a larger angle impart energy to recoil electrons within the material. The resulting radiation at larger scatter angles is at lower energy and, in general, penetrating power. Generally, detectors respond better to one energy than another, so by positioning the source and detector with an optimum response angle $\theta$ between them as shown in FIGURES 2a and 2b, the backscattered radiation not detected can be minimized. The greater angle $\theta$ becomes, the larger the volume of wall 18 that is in the area of "intersection" of the incident and reflected rays but also the larger the source-detector device becomes. So a compromise in this respect along optimization of response is generally reached. The remaining backscattered radiation is reduced in energy and intensity by geometry so that the shielding of equipment or personnel can be accomplished simply. The more penetrating radiation is either absorbed within the thickness of the shield or else passes through the other side of the siheld.

FIGURE 2c is a plot of the reflected radiation for various reflector thicknesses. When a reflected thickness is zero, there is no significant signal received at the detector. As the thickness of the reflector increases, a larger amount of radiation is backscattered. However, beyond some point, adding incremental thicknesses (for example, $\Delta x_1$, $\Delta x_2$, and $\Delta x_3$) causes only small changes in the received radiation. The magnitude and shape of the curve shown in FIGURE 2c is determined by (1) the quantity and quality of the radiation from the source, (2) the scatter angle between the source and detector, (3) the collimation of the source and detector, and (4) other geometrical factors.

Various sources can be used to provide an optimum response with respect to thickness changes. Among the types of sources that can be used are the following:

(a) Gamma radiation from a pure gamma emitter,
(b) Beta-excited X-ray sources (bremsstrahlung sources); and
(c) Compound bremsstrahlung X-ray and beta-ray sources.

The two latter sources are shown in FIGURES 3 and 4.

FIGURE 3 shows the construction of a beta-excited X-ray source. In this source, beta particles (high-speed electrons) from a beta source capsule 22 and emitter 24 strike a target 26, which in known manner causes issuance of X-rays through the X-ray window or aperture in an X-ray shield and collimator 28. The target is constructed of material of high atomic number (high Z). Various materials may be used for the X-ray target, depending upon the required optimum characteristics of the X-ray. Target materials utilized in industrial thickness gauges are (1) aluminum, (2) aluminum-gold matrix, (3) tungsten, and (4) Mu Metal. The thickness of the target can be varied to change the energy distribution.

The advantage of these beta-excited sources is that the shielding and also handling techniques for the beta radiation are fairly simple. For example, 0.1" of Teflon will absorb beta rays with maximum energy of approximately 2 mev. In FIGURE 3, a low Z material 30 is used to shield and collimate the beta source. Screw plug 32 is also preferably of low Z material. The use of a low Z material provides a good shield against backscattering of the betas. Since the "working" or "hard" radiation is directed downward toward the shield material, beta particles that might be scattered backwards into the interior of a nose cone section are totally absorbed by the low Z beta shielding material. A large number of such beta-excited sources have been utilized in industrial applications.

Another useful radiation source is a compound X-ray and beta-ray source constructed in the novel manner illustrated in FIGURE 4a. This source is similar to the previous beta-excited X-ray source. However, a certain proportion of the beta rays are allowed to pass through an X-ray target 26' via a centrally located beta ray window or aperture 34 therein, which is of predetermined opening area, so as to yield a controlled radiation mixture of high penetrating (high energy) X-rays and low penetrating (low energy) beta rays. The window can be a hole in the target material or a thinner or different piece of material that does not absorb all the beta rays, allowing some beta rays to pass through. This compound source has high utility in reflection measurements in which it is desired to obtain a high sensitivity to thickness changes for a smaller initial range of thickness and at the same time provide an indication of thickness over a very wide range.

The reflected radiation intensity vs. reflector thickness curve for the FIGURE 4a source is shown in FIGURE 4b. Especially for ablation shields, there is particular interest in precise thickness determinations when the material becomes dangerously thin. In this thickness region, $0$–$x_1$, a larger and linear signal is available as shown in FIGURE 4b. Over the full thickness range from zero to a maximum thickness $x_2$ for example, a logarithmic response relating detected intensity to thickness is available. It is apparent therefore that because of its construction, this single compound source is useful for measuring a very wide range of thicknesses, much more so than heretofore contemplated, with linear high sensitivity for thin areas and a low sensitivity over the rest and larger part of the wide thickness range.

Of course, the radiation detector 18 in FIGURE 1 is of the type appropriate to the type of radiation source used. That is, the detector responds to gamma or bremsstrahlung or bremsstrahlung and beta radiation, etc., according to the source emloyed. If a comound beta- bremsstrahlung source is used, the detector therefore would be made to have relatively low sensitivity to bremsstrahlung and relatively high sensitivity to beta radiation so that the detector resonse will be like the FIGURE 4b curve. In any event the received reflected radiation is converted to a small signal by the appropriate radiation detector 18. Selectivity of reflected radiation energy may be accomplished in known manner. For example, the radiation detector may itself be energy selective or an electronic energy discriminator may be used to "process" the output from the radiation detector, as is well known in the art. Various radiation detectors may be utilized. If high operating point stabilities are not required, then some of the newer solid state detectors can be employed. However, extremely stable and at the same time small and lightweight ionization chamber detectors can be used. The amplifiers for use with this thickness measuring device in circuitry 19 are preferably miniaturized printed circuit devices.

The advantage of the backscatter or reflection type of thickness gauge in this environment compared to the type to be described below is that the ablation shield material itself does not require a modification. That is, nothing is imbedded in the material or mixed with it.

In the transmission method for measuring the ablation shield thickness as shown in FIGURES 5 and 6, a radioactive material in the form of cores 36 is mixed with the ablation material at various locations about the nosecap shield 18′. The cores are small diameter sections extending throughout the full thickness of the shield. As the outer surface of the shield is burned off so ablates the outer end of the adjacent core or cores 36, and consequently the intensity of radiation on the inner surface of the shield varies. A linear signal output to thickness variation can be obtained. The thin cores yield a radiation which is sensed by corresponding radiation detectors 14′ placed at the inner end of the cores flush with the inside surface of the shield material. These detectors may be fed into common electronic circuitry 38 (such as in FIGURE 7) and thickness read remotely on meter 20. Detected radiation increases as thickness increases.

FIGURE 6 shows in greater detail a cross-section of a radioactive core 36, the ablation shield material 18′, and a radiation detector 14′. The radioactive core may be thought to consist of a stack of thin laminar radioactive discs. As radiation emanates from each such theoretical disc, the radiation is absorbed by the other discs between it and the detector. Further, the radiation from each laminar disc after undergoing absorption is accumulated at the radiation detector. An aperture or detector window 38 permits the radiation from the core to enter the detector. This aperature consists of a circular center in a shielding plate 40. Rays such as those marked 42 and 44 in FIGURE 6 which emanate from the core at an oblique angle are absorbed in the radiation shield 40. Rays such as those that would travel along dash line 46 are substantially self-absorbed in the ablation material due to the long oblique path followed. Hence the radiation level inside the core is negligible. Detectors 14′ may be of any desired type and should be reliable, rugged and accurate. Of course, the radiation cores should possess substantially the same density and ablation characteristics as the rest of the heat shielding material. The transmission type of thickness device can be made extremely simple, very rugged, and highly reliable.

Instead of using cores per se as illustrated in FIGURES 5 and 6, spheres or other shapes of radioactive material may be mixed in with the ablation shield material, either as the shield is being formed or after formation thereof, as desired. The entire shield could be radioactive with a roughly even dispersement of radioactive material throughout the shield. Because of its ease of manufacture, the core embodiment of FIGURES 5 and 6 is presently preferred. Such cores can be made compound beta and bremsstrahlung sources to effect the FIGURE 4b curve, if desired, by mixing powdered target material in with beta emitting material, which mixture cores 36 may be considered to begin one embodiment thereof.

FIGURE 7 is a block diagram of circuits for measuring the shield thickness in any of the foregoing embodiments. While the FIGURE 1 embodiment may be expanded to employ a plurality of source-detector units 10, the FIGURE 7 embodiment may be changed to use just one core and detector unit. Where a plurality of detectors are employed, they may be time shared by one common set of electronics by multiplexer 48, which feeds into, as part of the electronics circuitry, radiation energy discriminator 50. This latter element is set so as to select a particular spectral component of the incoming radiation. It should be noted that spectral selectivity may alternatively be accomplished in either the radiation detector itself or in an energy discrimination circuit, or in both. A printed circuit preamplifier 52 is utilized to increase the signal level. Separate amplifying and signal channels Nos. 1 and 2 may follow the preamplifier for linear and non-linear or logarithmic readout or data depending upon the type of output scale or scales required. For example, in a backscatter gauge with the source shown in FIGURE 4a, channel 1 can respond to the low signal levels to indicate linearly the small thickness and channel 2 can indicate on a log scale the larger thicknesses corresponding to the larger signal levels. Further, other signal processing equipment may be incorporated to match the thickness measuring system to various telemetering or recording devices.

It is therefore apparent this invention has provided an optimum system for measuring the thicknes of ablation surface and for supplying guidance information for vehicle re-entry, which should enhance the performance of various spacecraft, especially those in which humans are aboard.

All the above mentioned objects and advantages have been provided by this invvention. Still others, and even further modifications and embodiments of the invention, will be apparent to those of ordinary skill in the art upon reading this disclosure. However, it is to be appreciated that this disclosure is intended to be exemplary, not limitative, the invention being defined by the appended claims.

What is claimed is:

1. In combination:
    a spacecraft which has an outer wall material subject on its outer surface, during re-entry into an atmosphere, to ablation effecting consequent reduction in wall thickness,
    means, including nucleonic radiation detection means disposed adjacent the inner surface of said wall material opposite a region thereof subject to ablation during re-entry, for determining the intensity of predetermined nucleonic radiation during said ablation, said detection means including a plurality of detectors respectively disposed at various locations on the said inner surface of the wall material,
    a multiplexer between said detectors and translating means for time sharing with said translating means the outputs of the detectors,
    source means for providing said predetermined nucleonic radiation to said detection means in an intensity related to said wall thickness, and
    means coupled to said intensity determining means for translating the determined intensities into corresponding wall thicknesses.

2. The combination in claim 1 wherein said source means is also disposed adjacent the inner surface of said wall material with said radiation being generally directed onto said inner surface at a given angle, said detection means being disposed to receive said predetermined radiation from said source means by reflection from the said outer surface of said wall material.

3. The combination in claim 2 wherein said angle is acute.

4. The combination in claim 2 wherein said predetermined nucleonic radiation received by said detection means is electromagnetic radiation.

5. The combination in claim 4 wherein said source means includes a bremsstrahlung source.

6. The combination in claim 5, wherein said bremsstrahlung source comprises a beta emitter and a target having an atomic number high enough to cause X-rays upon being struck by beta particles from said emitter.

7. The combination in claim 6 wherein said target has a beta ray window of predetermined size whereby said predetermined nucleonic radiation from said source means is a controlled mixture of beta and X-rays so as to provide a linear relationship between radiation intensity and the thickness of said wall material for thicknesses from zero up to a given thickness and from thereon a nonlinear relationship.

8. The combination in claim 1 wherein said source means includes radioactive material mixed with the said wall material at various locations therein.

9. The combination in claim 8 wherein each of said radioactive material locations includes a respective radiation core extending throughout the full thickness of said wall material and subject at an outer end to said ablation the same as said outer surface during re-entry of the spacecraft to an atmosphere, thereby decreasing the length of such cores and changing the intensity of the predetermined nucleonic radiation therefrom in correspondence to changes in wall thickness due to ablation, said detection means including a respective radiation detector for each of said cores.

10. The combination in claim 9 wherein said detectors are disposed on the inner surface of said wall material and each includes a windowed shielding material contiguous to said inner surface for preventing entrance into the respective detector of radiation other than said predetermined nucleonic radiation directly from the respective core.

11. In combination:
a spacecraft which has an outer wall material subject on its outer surface, during re-entry into an atmosphere, to ablation effecting consequent reduction in wall thickness,
means, including nucleonic radiation detection means disposed adjacent the inner surface of said wall material opposite a region thereof subject to ablation during re-entry, for determining the intensity of predetermined nucleonic radiation during said ablation,
source means for providing said predetermined nucleonic radiation to said detection means in an intensity related to said wall thickness, said source means including at least one elongated core of radioactive material placed at a location in said wall material and extending lengthwise throughout at least a substantial part of the full thickness of said wall material to said outer surface, said core constituting a narrow elongated source of radioactive material located in said material wall to radiate a controlled amount of radiation at said location for measurement of the wall material thickness at said location, said at least one core being subject at an outer end to said ablation the same as said outer surface during reentry of the spacecraft to an atmosphere, thereby decreasing the length of said at least one core and changing the intensity of predetermined nucleonic radiation therefrom in correspondence to changes in wall thickness due to ablation,
said detection means including a respective radiation detector for each said at least one core positioned to receive substantially only radiation from the core associated therewith, and
means coupled to said intensity determining means for translating the determined intensities into corresponding wall thicknesses.

References Cited
UNITED STATES PATENTS

| | | |
|---|---|---|
| 2,769,097 | 10/1956 | Lord. |
| 2,874,303 | 2/1959 | Lane _____ 250—83 |
| 2,964,631 | 12/1960 | Foster. |
| 2,967,938 | 1/1961 | McKay et al. |
| 2,999,935 | 9/1961 | Foster. |
| 3,034,244 | 5/1962 | Heiman _____ 250—106 X |
| 3,087,061 | 4/1963 | Dukes et al. |
| 3,132,329 | 5/1964 | Penter _____ 340—183 |
| 3,210,545 | 10/1965 | Barnett. |
| 3,271,572 | 9/1966 | Lieber et al. |
| 3,315,076 | 4/1967 | Jordan _____ 250—83.30 |

RALPH G. NILSON, *Primary Examiner.*

S. ELBAUM, *Assistant Examiner.*

U.S. Cl. X.R.

250—106, 84

UNITED STATES PATENT OFFICE
CERTIFICATE OF CORRECTION

Patent No. 3,439,166              Dated April 15, 1969

Inventor(s)   Henry R. Chope

It is certified that error appears in the above-identified patent and that said Letters Patent are hereby corrected as shown below:

In Column 1, the Abstract of the Disclosure was not properly set off from the specifications. The first full paragraph of the specifications, lines 26 through 33, beginning "The second method of measuring" and ending "is reduced accordingly.", should be set off as the second paragraph of the Abstract of the Disclosure. Column 6, line 30, "invvention" should read -- invention --.

Signed and sealed this 20th day of April 1971.

(SEAL)
Attest:

EDWARD M.FLETCHER,JR.                WILLIAM E. SCHUYLER, JR.
Attesting Officer                    Commissioner of Patents